(12) United States Patent
Nagasaka

(10) Patent No.: US 7,916,364 B2
(45) Date of Patent: Mar. 29, 2011

(54) IMAGE READING DEVICE

(75) Inventor: Hideaki Nagasaka, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 820 days.

(21) Appl. No.: 11/926,933

(22) Filed: Oct. 29, 2007

(65) Prior Publication Data

US 2008/0100888 A1    May 1, 2008

(30) Foreign Application Priority Data

Oct. 31, 2006   (JP) .................................. 2006-297118

(51) Int. Cl.
*H04N 1/46* (2006.01)

(52) U.S. Cl. ........ 358/514; 358/474; 358/509; 358/475; 358/1.9; 348/E5.027; 348/294; 399/32; 399/31

(58) Field of Classification Search .................. 358/509, 358/474, 475, 1.13, 514, 441, 406, 505, 1.9, 358/1.3, 482, 494; 348/E3.027, 294; 399/32, 399/31, 159, 174
See application file for complete search history.

(56) References Cited

U.S. PATENT DOCUMENTS

| | | | | |
|---|---|---|---|---|
| 4,160,279 | A | * | 7/1979 | Fuwa ............................. 358/474 |
| 4,173,772 | A | * | 11/1979 | White ........................... 358/482 |
| 4,680,644 | A | * | 7/1987 | Shirato et al. .................. 358/474 |
| 4,796,093 | A | * | 1/1989 | Asano ............................ 358/475 |
| 4,839,739 | A | * | 6/1989 | Tachiuchi et al. ............. 358/466 |
| 6,753,986 | B1 | * | 6/2004 | Sato .............................. 358/505 |
| 7,616,359 | B2 | * | 11/2009 | Sekizawa et al. ............. 358/509 |
| 2002/0015196 | A1 | * | 2/2002 | Kitamura et al. ............. 358/505 |
| 2004/0012830 | A1 | * | 1/2004 | Yokochi ........................ 358/474 |
| 2004/0032626 | A1 | * | 2/2004 | Rossi ............................. 358/504 |
| 2004/0032628 | A1 | * | 2/2004 | Sato et al. ..................... 358/514 |
| 2005/0094215 | A1 | * | 5/2005 | Nagasaka ..................... 358/406 |
| 2005/0206969 | A1 | * | 9/2005 | Murade ......................... 358/474 |

FOREIGN PATENT DOCUMENTS

| | | |
|---|---|---|
| JP | 2001-136345 | 5/2001 |
| JP | 2005-176187 | 6/2005 |

* cited by examiner

*Primary Examiner* — Negussie Worku

(74) *Attorney, Agent, or Firm* — Scully, Scott, Murphy and Presser, P.C.

(57) ABSTRACT

An image reading device includes a clock generator, an image sensor, a plurality of switches having a first switch and a second switch, a reader, a first controller, and a second controller. The clock generator generates a first clock signal having a first cycle and a second clock signal having a second cycle shorter than the first cycle. The image sensor detects an image formed on a document to generate an image signal. The image signal is inputted into the first switch and the second switch by rotation. The first switch and the second switch is capable of switching to simultaneously or alternately output the image signal in synchronization with the first clock. The reader reads the image signal outputted from the first switch and the second switch. The first controller controls the first switch to output the image signal to the reader during a first period and to control the second switch to output the image signal to the reader during a second period. The second controller controls the clock generator to generate the first clock signal during the first period and the second period and to generate the second clock signal during a third period that is between the first period and the second period and that is longer than a predetermined period $mT$ and shorter than $(k \times T1)$ The $T1$ is the first cycle. The $k$ is a minimum integer that satisfies $mT<(k \times T1)$.

7 Claims, 6 Drawing Sheets

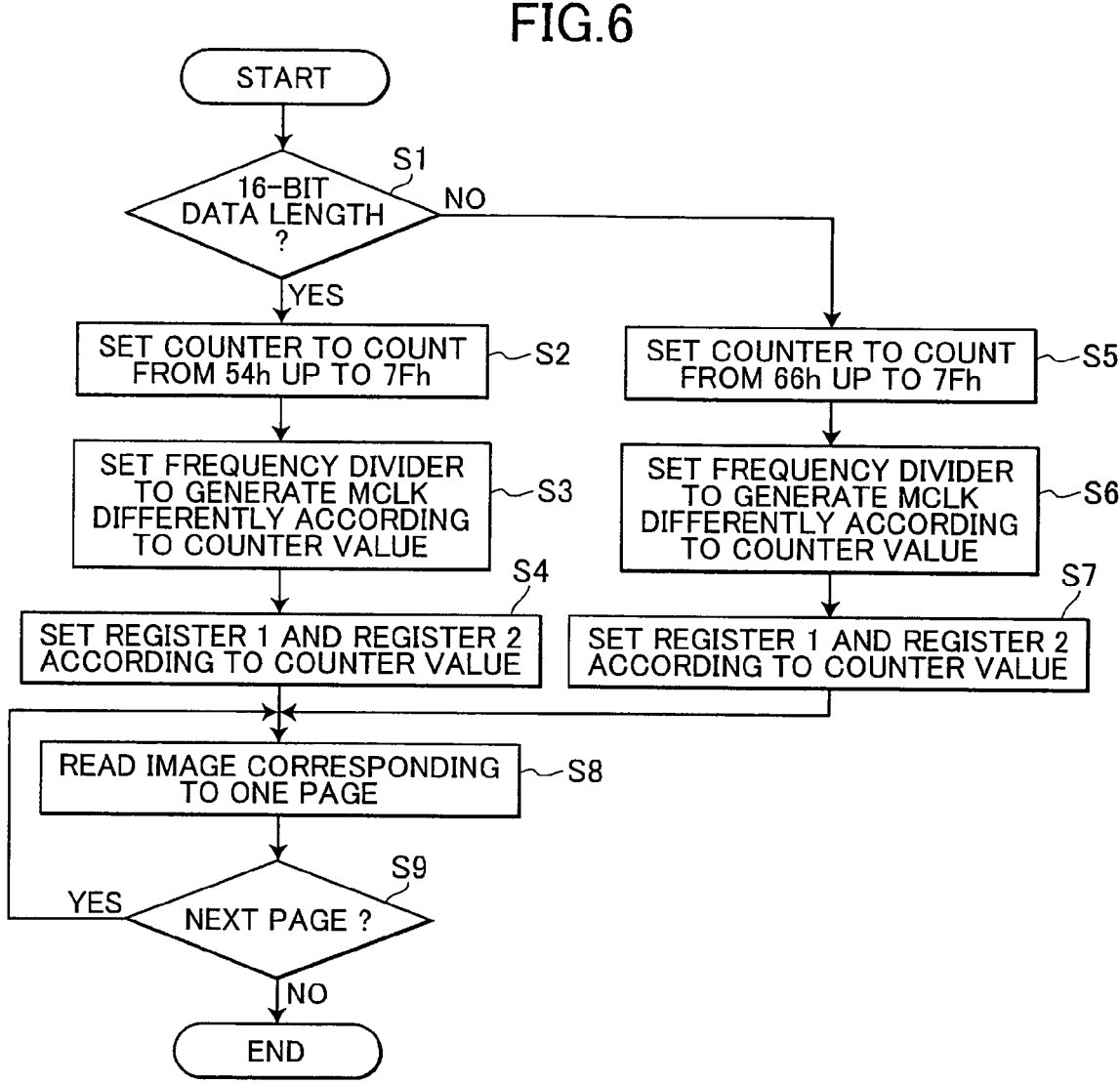

IMAGE READING DEVICE

CROSS REFERENCE TO RELATED APPLICATION

This application claims priority from Japanese Patent Application No. 2006-297118 filed Oct. 31, 2006. The entire content of this priority application is incorporated herein by reference.

TECHNICAL FIELD

The present invention relates to an image reading device, and more particularly, to an image reading device capable of increasing its reading rate (reading speed).

BACKGROUND

An image reading device for reading an image formed on an original document is mounted on a printer, a facsimile machine, or a multi function peripheral which has the functions of printing the image, to transmit the image via a line, and store the image in a memory.

The image reading device forms image data in the following steps: irradiating an original document with light; converting the reflected light intensity into voltage values using photoreceptors (line image sensors) arranged in lines; and then converting the voltage values into digital data.

The line image sensor is divided into a plurality of sections. The voltage values outputted from the sections are sequentially converted into digital data, Japanese Unexamined Patent Application Publication No. 2001-136345 discloses an image reading device which sequentially reads signals from a plurality of sections of a line image sensor in synchronism with a given clock signal. In the image reading device, sections adjacent to each other in the length direction performs reading during a single reading period so as to partially overlap each other, thereby increasing its reading rate.

SUMMARY

However, in the disclosed image reading device, an interval is set to switch devices. The interval is in synchronism with a predetermined period during which switching outputs from the line image sensor is performed. This means that the interval is an integer-times as long as the predetermined period, thereby decreasing its reading rate.

In view of the above-described drawbacks, it is an object of the present invention to provide an image reading device capable of increasing its reading rate.

In order to attain the above and other objects, the present invention provides an image reading device including a clock generator, an image sensor, a plurality of switches having a first switch and a second switch, a reader, a first controller, and a second controller. The clock generator generates a first clock signal having a first cycle and a second clock signal having a second cycle shorter than the first cycle. The image sensor detects an image formed on a document to generate an image signal. The image signal is inputted into the first switch and the second switch by rotation. The first switch and the second switch is capable of switching to simultaneously or alternately output the image signal in synchronization with the first clock. The reader reads the image signal outputted from the first switch and the second switch. The first controller controls the first switch to output the image signal to the reader during a first period and to control the second switch to output the image signal to the reader during a second period. The second controller controls the clock generator to generate the first clock signal during the first period and the second period and to generate the second clock signal during a third period that is between the first period and the second period and that is longer than a predetermined period $mT$ and shorter than $(k \times T1)$. The $T1$ is the first cycle. The $k$ is a minimum integer that satisfies $mT<(k \times T1)$.

Another aspect of the present invention provides an image reading device including a clock generator, an image sensor, a plurality of switches having a first switch and a second switch, a reader, a first controller, and a second controller. The clock generator generates a first clock signal having a first cycle and a second clock signal having a second cycle shorter than the first cycle. The image sensor detects an image formed on a document to generate an image signal. The image signal is inputted into the first switch and the second switch by rotation. The first switch and the second switch is capable of switching to simultaneously or alternately output the image signal in synchronization with the first clock. The reader reads the image signal outputted from the first switch and the second switch. The first controller controls the first switch to output the image signal to the reader during a first period and to control the second switch to output the image signal to the reader during a second period. The second controller controls the clock generator to generate the first clock signal during the first period and the second period and to generate the second clock signal during a third period that is between the first period and the second period and that is shorter than the first cycle.

BRIEF DESCRIPTION OF THE DRAWINGS

The particular features and advantages of the invention as well as other objects will become apparent from the following description taken in connection with the accompanying drawings, in which:

FIG. 6 is a flowchart showing an image reading process.

DETAILED DESCRIPTION

Hereinafter, the preferred embodiment of the present invention is described with reference to accompanying drawings. The terms "upward", "downward", "upper", "lower", "above", "below", "beneath" and the like will be used throughout the description assuming that an image reading device is disposed in an orientation in which it is intended to be used.

Figure 1:
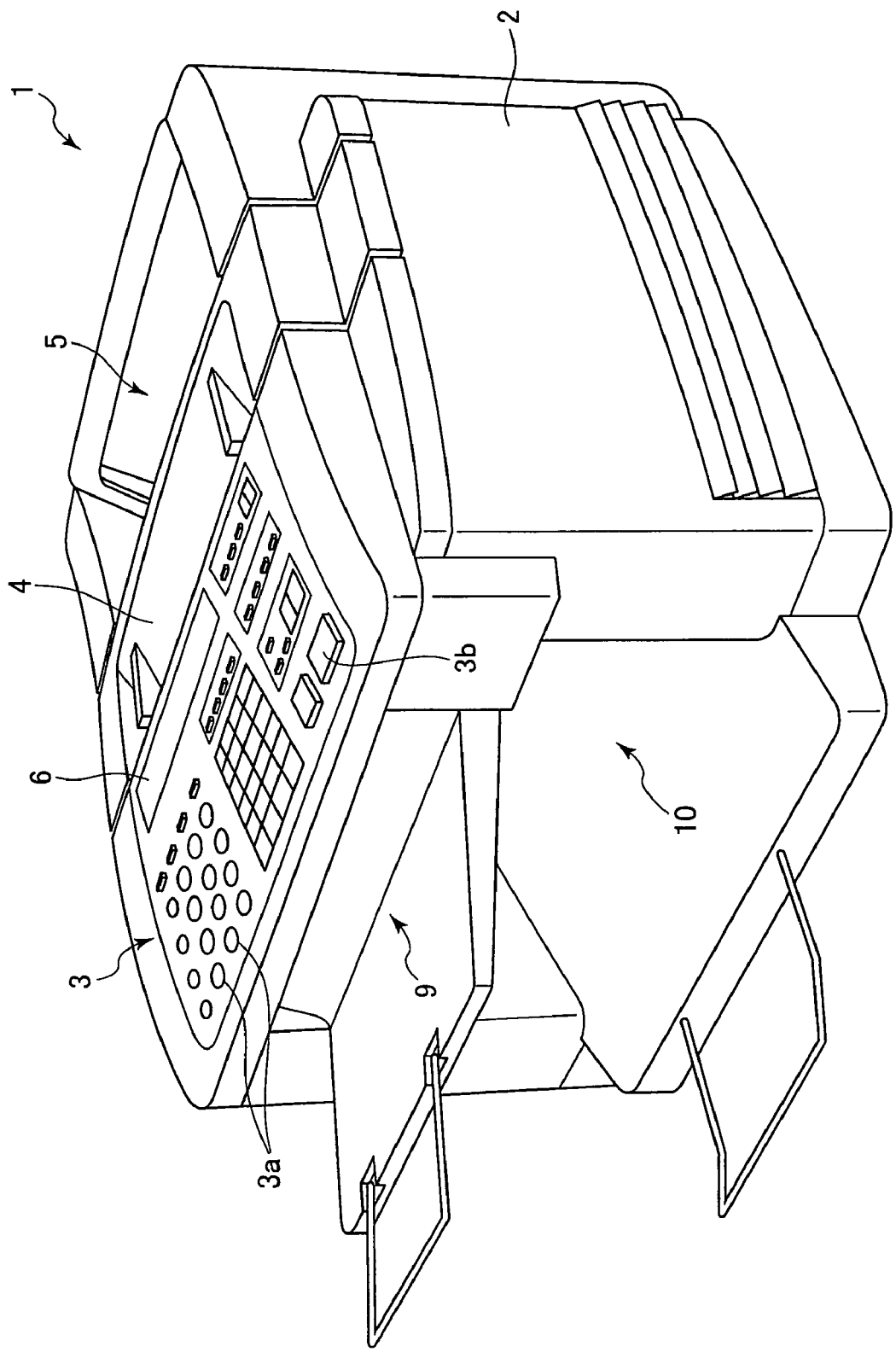
FIG. 1 is a perspective view showing the appearance of a multi function peripheral including an image reading device according to the embodiment of the present invention.

FIG. 1 is a perspective view showing the appearance of a multi function peripheral or equivalently multi function printer (hereinafter referred to as an "MFP") 1 which includes an image reading device according to the embodiment of the present invention. The MFP 1 has various functions such as a facsimile function, a printer function, a scanner function, and a copy function.

As show in FIG. 1, a main body 2 of the MFP 1 has a box-like shape. On the top face of the main body 2, an operation panel 3 is provided in a forward portion thereof. The operation panel 3 has various buttons including numeric (0-9) buttons 3a and a start button 3b. A user selects any suitable one of the buttons and then depresses the selected button to perform various operations. In the rear of the operation panel 3, a liquid crystal display (hereinafter, referred to as an "LCD") 6 is provided so as to display the setting status of the MFP 1 and various operational messages as required. In order to read an image from an original document, a user selects which has a higher priority, image quality or reading rate, by selecting one of the buttons. The selected status is displayed on the LCD 6.

In the rear of the LCD 6, an original-document table 4 is provided, on which a document to be faxed to a destination facsimile machine 51 (see FIG. 2) or a document to be copied is placed. The original-document table 4 allows a large number of documents to be stacked. The document placed on the original-document table 4 is fed into the main body 2 so that the image on the document is read using a scanner (image reading device) 19 (see FIG. 2). The document from which the image has been read is further fed and discharged onto an original-document discharge outlet 9 positioned below the operation panel 3. The original-document discharge outlet 9 allows a large number of documents to be stacked.

In the rear of the original-document table 4, a cassette-receiving opening 5 is provided, into which a sheet cassette (not shown) is detachably set. The sheet cassette contains a plurality of recording sheets in a stack. Each recording sheet is fed from the sheet cassette set into the cassette-receiving opening. After printing is done with a color printer 26 (to be described later), the printed sheet is discharged to a recording-sheet discharge outlet 10 provided below the original-document discharge outlet 9.

Figure 2:
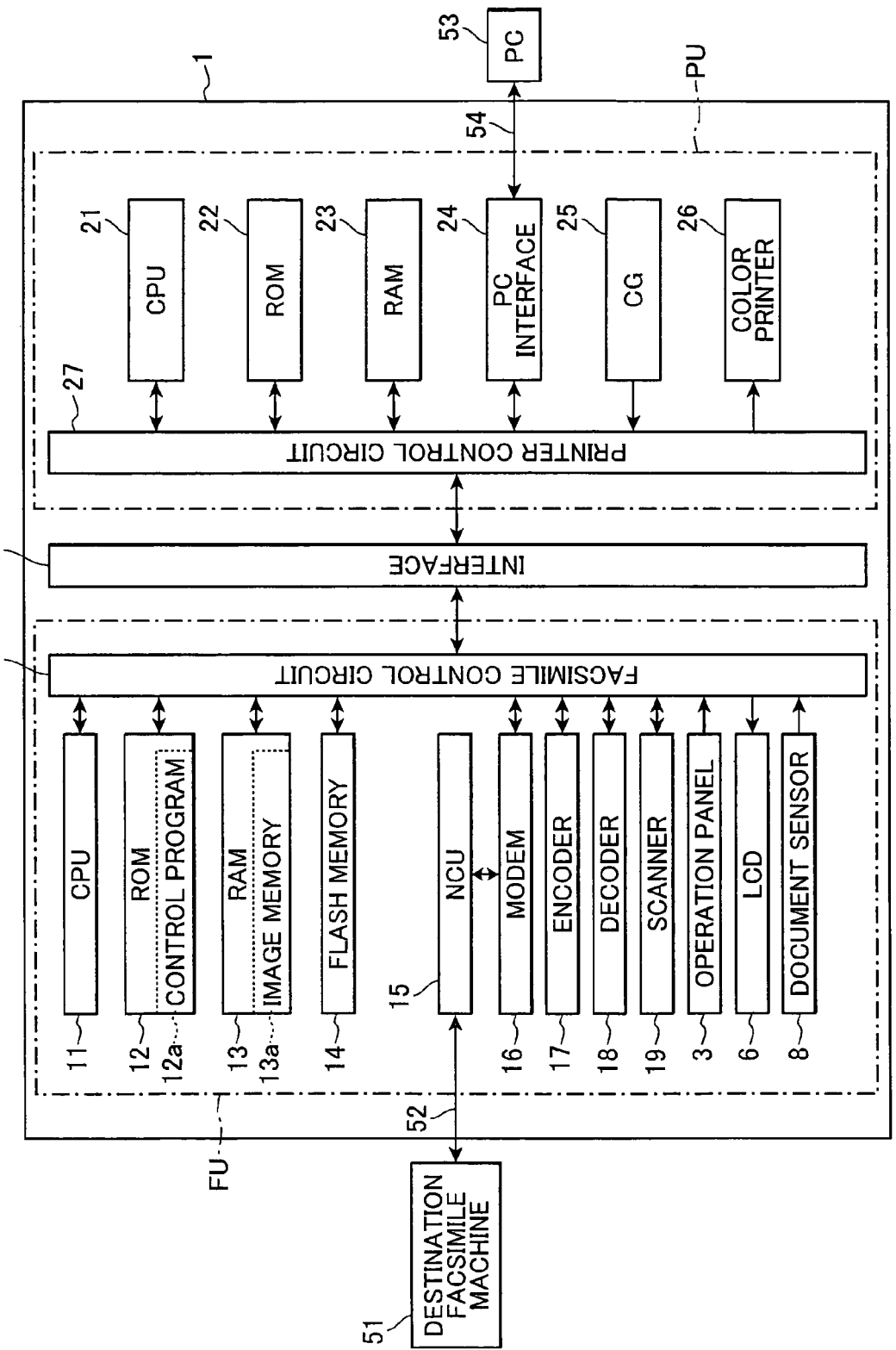
FIG. 2 is a block diagram showing the electrical configuration of the multi function peripheral.

FIG. 2 is a block diagram showing the electrical configuration of the MFP 1. The MFP 1 includes the following two units connected to each other through an interface 30: a facsimile unit FU and a printer unit PU. The facsimile unit FU includes a CPU 11, a ROM 12, a RAE 13, a flash memory 14, a network control unit (hereinafter referred to as an "NCU") 15, a modem 16, an encoder 17, a decoder 18, a scanner 19, the operation panel 3, the LCD 6, and a document sensor 8. These components are connected to one another through a facsimile control circuit 20.

The CPU 11 controls each of the components connected to the facsimile control circuit 20 so as to perform facsimile operation or the like, based on various signals transmitted/received through the NCU 15. The ROM 12 is an unrewritable memory which stores various control programs 12a to be executed in the MFP 1.

The RAM 13 is a rewritable memory which stores various kinds of data. The image data of a document which has been read using the scanner 19 is stored In an image memory 13a. An image is read by a line image sensor in the form of voltage values; the voltage values are converted into numeric data by an A/D converter (not shown) in an AFE (see FIG. 3); and the numeric data is then stored in the image memory 13a as image data after several corrections being made.

The flash memory 14 is a rewritable, nonvolatile memory. The data stored in the flash memory 14 is retained even after the MFP 1 is powered off.

The NCU 15 transmits a dial signal to a telephone network (telephone line 52) and responds to a ringing signal from the telephone line 52. The modem 16 modulates/demodulates image data for transmission to/reception from the destination facsimile machine 51 through the NCU 15, as well as transmits/receives various procedure signals for transmission control. The encoder 17 encodes the document image data read by the scanner 19 for compression. The decoder 18 decodes encoded data, such as received facsimile data.

The scanner 19 is provided to read an image from an original document inserted into the MFP 1 from the original-document table 4. The whole document image is read by relatively shifting the document gradually and an optical system from each other. The line image sensor is disposed perpendicularly to the direction of shifting the document and the optical system relatively from each other, so as to read the image formed on the document. The scanner 19 will be described later in detail. The document sensor 8 detects the presence of a document, or equivalently, whether or not a document is placed on the original-document table 4. The facsimile unit FU of the MFP 1 is connected to the destination facsimile machine 51 via the NCU 15 and the telephone line 52.

The printer unit PU includes a CPU 21 as a processor; a ROM 22 which stores control programs to be executed by the CPU 21; a RAM 23 which has various work memories to be referred to and to be updated when the CPU 21 operates, and a print memory for storing print data; a personal computer interface 24 to be connected with a personal computer (hereinafter referred to as a"PC") 53 as a main unit; a character generator (hereinafter referred to as a "CG") 25 which stores vector fonts such as characters for printing; and a color printer 26 capable of full-color printing. These components are connected to one another through a printer control circuit 27.

The PC interface 24, for example, is a USB-compliant serial interface. The MFP 1 transmits data to/receives data from the PC 53 through a cable 54 connected to the PC interface 24.

Figure 3:
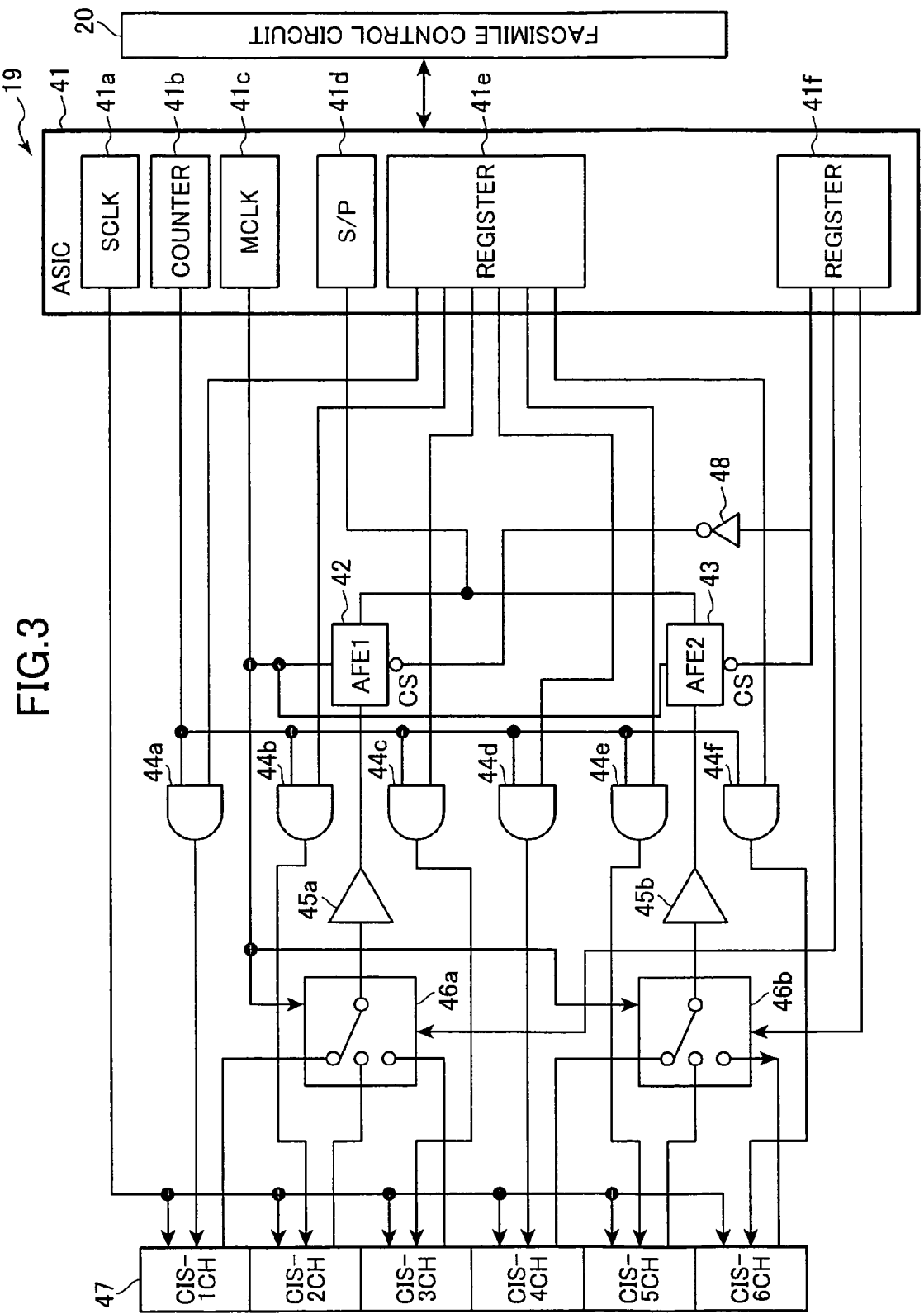
FIG. 3 is a block diagram showing the electrical configuration of the image reading device.

FIG. 3 is a block diagram showing the electrical configuration of a read circuit included in the scanner 19. As shown in FIG. 3, the read circuit includes an ASIC 41, AFEs 42 and 43, AND circuits 44a-44f, amplifiers 45a and 45b, selector switches 46a and 46b, and a contact image sensor (CIS) 47 as a line image sensor. The CIS 47 is divided into six channels. Although the line image sensor includes RGB three-color light sources for detecting a color image, their arrangement are not shown in the figure.

The ASIC 41 (application specific integrated circuit) is connected to the CPU 11, the ROM 12, and the RAM 13 shown in FIG. 2, through the facsimile control circuit 20. The ASIC 41 includes a system clock oscillator 41a which generates original clock pulses; a counter 41b which counts the original clock pulses; a frequency divider 41c which divides a given clock frequency according to the value of the counter 41b so as to generate clock pulses at a divided frequency; a serial-parallel converter 41d which changes a serial digital signal into a parallel digital signal; a first register 41e; and a second register 41f.

The system clock oscillator 41a generates original clock pulses at a frequency of 100 Mhz. The original clock pulses are inputted to the counter 41b. The counter 41b repeatedly counts from an initial value up to a final value, the values which have been set by the CPU 11.

The frequency divider 41c generates M clock pulses based on the counter values of the counter 41b specified by the CPU 11, and then outputs the M clock pulses. A/D converted serial digital values, which have been outputted from the AFE 42 or the AFE 43, are sequentially inputted to the serial-parallel converter 41d, and then converted into parallel digital values. The parallel digital values are read by the CPU 11, so as to be stored in the image memory 13a of the RAM 13.

The first register 41E, which includes six output ports, outputs control signals so that the channels are selected within the CIS 47 for detection in synchronism with the counter 41b. The control signals are inputted to one input port of the respective AND circuits 44a-44f. The output from the counter 41b is inputted to the other input port of each of the AND circuits 44a-44f. The respective output ports of the AND circuits 44a-44f are connected to the six channels of the CIS 47.

The second register 41f outputs signals in synchronism with the counter, so that the output from either of the AFEs 42 and 43 is selectively inputted to the serial-parallel converter 41d, and so that the selector switches 46a and 46b are controlled.

The AFEs 42 and 43 are connected to the serial-parallel converter 41d. Each of the AFEs 42 and 43 includes a chip select terminal (CS), and outputs serial data to the serial-parallel converter 41d when the chip select terminal is in the low level. The chip select of the AFE 43 is directly connected to the second register 41f. The chip select of the AFE 42 is connected to the second register 41f through an inverter 48. Therefore, the AFE 42 outputs serial data when the second register 41f outputs the high level signal, while the AFE 43 outputs serial data when the second register 41f outputs the low level signal. Note that the AFE 42 and the AFE 43 may be controlled individually to output serial without the inverter 48.

Each of the AFEs 42 and 43 is a circuit called an "analog front-end" The voltages outputted from the channels within the CIS 47 are amplified by the amplifier 45, and then inputted to the AFEs 42 and 43. The AFEs 42 and 43 A/D converts the inputted voltages to the digital value, and outputs the digital value to the serial-parallel converter 41d as serial data, in synchronism with the M clock pulses.

Three outputs from the first to third channels of the CIS 47 are inputted to the selector switch 46a. The selector switch 46a sequentially selects one output after another from the three outputs, so as to further output them to the amplifier 45a, according to the control signals transmitted from the second register 41f as well as the M clock pulses outputted from the frequency divider 41c.

Similarly, three outputs from the fourth to sixth channels of the CIS 47 are inputted to the selector switch 46b. The selector switch 46b sequentially selects one output after another from the three outputs, so as to further output them to amplifier 45b, according to the control signals transmitted from the second register 41f as well as the M clock pulses outputted from the frequency divider 41c.

The CIS 47 includes photoreceptors of the number corresponding to the number of pixels provided across its entire read width. In the embodiment, the entire width is divided into two broader sections, and the respective broader sections are further divided into three subsections, or equivalently, the first to third channels and the fourth to sixth channels. The original clock pulses generated by the system clock oscillator 41a are transmitted to each of the channel. The output from each of the AND circuits 44a-44f is also transmitted thereto. These control signals select one channel. The voltage value detected by the photoreceptors belonging to the selected channel is outputted to the AFE 42 or 43 through the selector switch 46a and the amplifier 45a or the selector switch 46b and the amplifier 45b.

Figure 4:
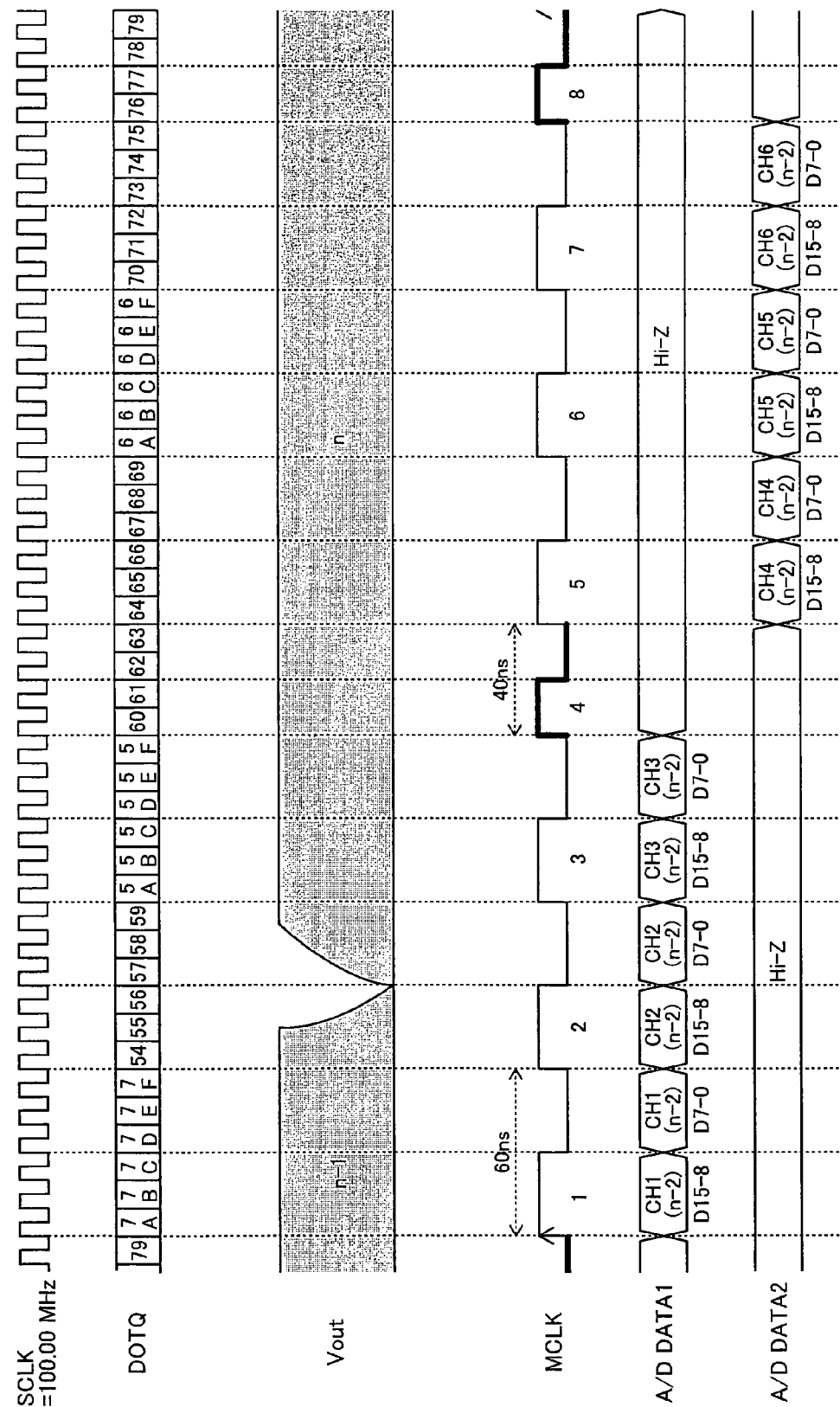
FIG. 4 is a timing diagram showing a case in which data to be read has a length of 16 bits.
Figure 5:
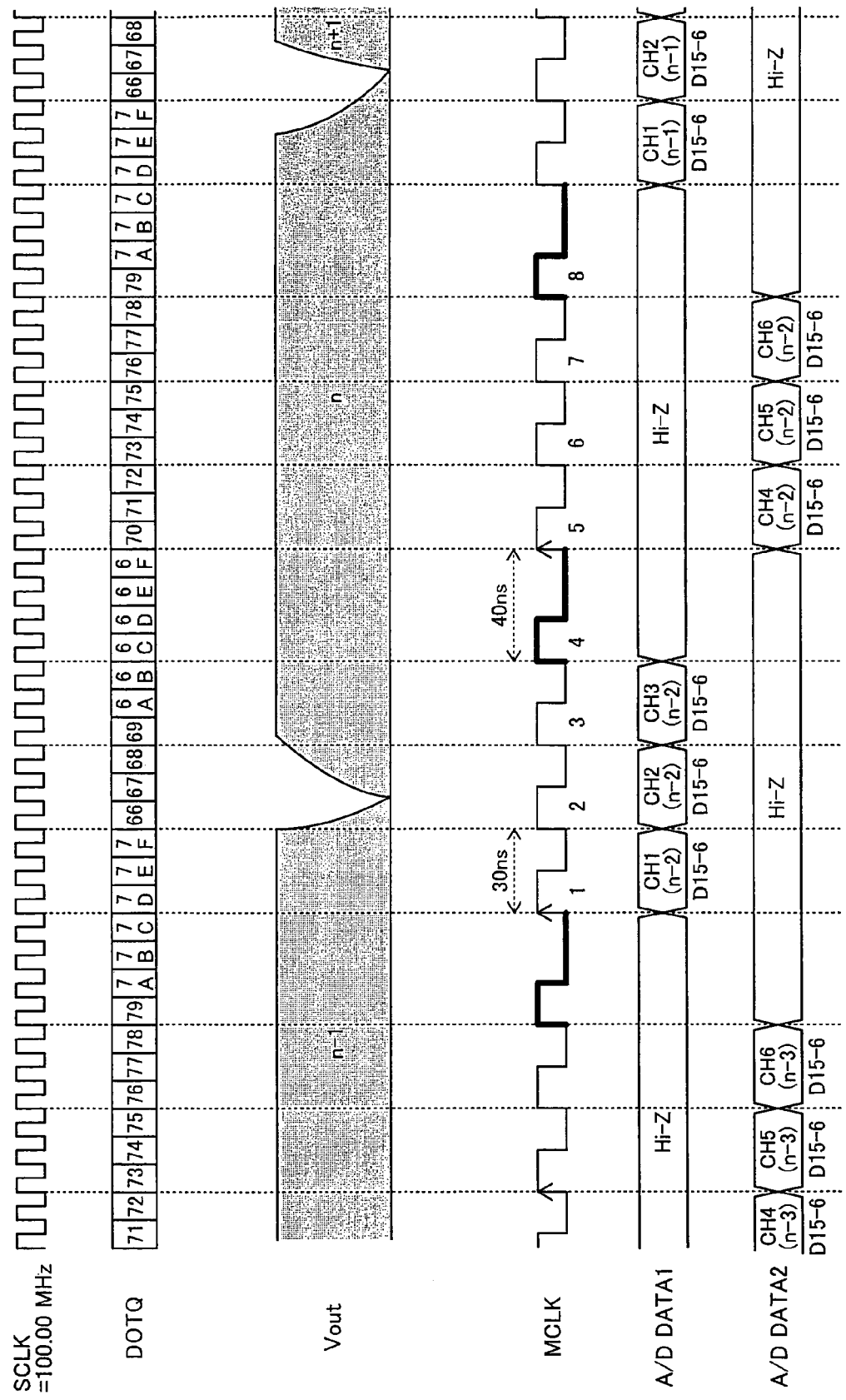
FIG. 5 is a timing diagram showing a case in which data to be read has a length of 10 bits.

FIG. 4 and FIG. 5 are timing diagrams showing an image reading process performed by the read circuit. FIG. 4 shows a case in which the converted digital value has a data length of 16 bits. FIG. 5 shows a case in which the converted digital value has a data length of 10 bits. In order to read an image, if a higher priority is placed on image quality than reading rate, 16 bits is selected for data length. If a higher priority is placed on reading rate than image quality, 10 bits is selected for data length. Whether image quality or reading rate gets a high priority is set by a user through the buttons provided on the operation panel 3. Alternatively, the setting may be such that 10 bits is selected for facsimile or copy function, 16 bits being selected for scanning function.

With the horizontal axis as a lapse of time, each of the timing diagrams shows in the following order from the top: original clock pulses (SCLK) generated by the system clock oscillator 41a; values (DOTQ) counted by the counter 41b; analog voltage values (Vout) outputted from the CIS 47; M clock pulses (MCLK) generated by the frequency divider 41c; digital signals (A/D DATA 1) outputted from the AFE 42; and digital signals (A/D DATA 2) outputted from the AFE 43. Although not shown in each of the timing diagrams, the timing of switching the selector switches 46a and 46b so that analog voltages is inputted to the AFEs 42 and 43 sequentially from one channel after another within the CIS 47, is in synchronism with the M clock pulses generated by the frequency divider 41c.

In the case shown in FIG. 4, the counter 41b is set so as to count from 54h up to 7Fh (in hexadecimal representation). During this time, digital values are sequentially outputted from the six CIS channels to the serial-parallel converter 41d. Each of the channels includes a plurality of photoreceptors. In the figure, analog voltage values "Vout" from the six channels are shown as (n−1)th and the nth. In A/D DATA 1 and 2 of FIG. 4, analog voltage values "Vout" outputted from the CIS 47 at a timing of (n−2), which comes before "n−1" in the figure, is converted into a digital value, and then outputted.

Numbers are assigned to the M clock pulses for a clear description. Each of the 1st to the 3rd M and the 5th to 7th M clock pulses has one set of a high time and a low time, with a period of 60 ns, which is equal to six times of the period of the original clock pulses, In the 1st M clock pulse, the higher order 8-bit values (15th to 8th bits, or equivalently, D15-8) out of the 16-bit digital values within the 1st channel are outputted during the high time, and the lower order 8-bit values (7th to 0th bits, or equivalently, D7-0) are outputted during the low time. In each of the second and third M clock pulses, similarly, the higher order 8-bit values are outputted during the high time, and so are the lower order 8-bit values during the low time.

In the 4th M clock pulse, switching from the AFE 42 to AFE 43 is performed. As the 3rd M clock pulse is finished, the chip select of the AFE 42 is switched to the high level from the low level so that the output of the AFE 42 has a high impedance.

On the other hand, the chip select of the AFE 43 is switched to the low level from the high level. In the 5th M clock pulse, the higher order 8-bit values of the 4th channel are outputted during the high time, and the lower order 8-bit values are outputted during the low time. Similarly, outputs are produced from the 5th channel in the 6th M clock pulse, and from the 6th channel in the 7th M clock pulse. In the 8th M clock pulse, switching from the AFE 43 to the AFE 42 is performed.

In the present invention, if "mT" that is the minimum switching interval determined by the length of digital data to be outputted and the switching rate of the AFEs 42 and 43, is shorter than "T1" that is the period of M clock pulses, switching interval for switching between the AFEs 42 and 43 is set to a value longer than "mT" and shorter than "T1".

In FIG. 4, the minimum switching interval "mT" is about 35 ns, and "T1" is 60 ns. Therefore, the switching interval is set to 40 ns shorter than "T1" (60 ns), which is equal to four times of the period of the original clock pulse. This reduces the time required for reading a digital signal as well as increasing the reading rate.

In the case shown in FIG. 5, the counter 41b is set so as to count from 66h up to 7Fh. During this time, digital values are sequentially outputted from the six CIS channels to the serial-parallel converter 41d. Similarly to the case shown in FIG. 4, this figure shows the (n−1)th, the n-th, and the (n+1)th outputs from the left.

Numbers are assigned to the M clock pulses for a clear description. Each of the 1st to the 3rd and the 5th to 7th M clock pulses has one set of a high time and a low time, with a period of 30 ns, which is equal to three times of the period of the original clock pulses. In the 1st M clock pulse, 10-bit digital values (D15-6) are outputted through the high time and the low time. In each of the second and third M clock pulses, 10-bit digital values are similarly outputted.

In the 4th M clock pulse, switching from the AFE 42 to AFE 43 is performed. As the 3rd M clock pulse is finished, the chip select of the AFE 42 is switched to the is high level from the low level so that the output of the AFE 42 has a high impedance.

On the other hand, the chip select of the AFE 43 is switched to the low level from the high level. In the 5th M clock pulse, the 10-bit values of the 4th channel are outputted. Similarly, outputs are produced from the 5th channel in the 6th M clock pulse, and from the 6th channel in the 7th M clock pulse. In the 8th M clock pulse, switching from the AFE 43 to the AFE 42 is performed.

In the present embodiment, if "mT" is longer than "T1", the switching interval is set to a value longer than "mT" and shorter than (k×T1). "k" is a max integer equal to 0 or larger that satisfies (k×T1)>mT, In FIG. 5, since "mT" is about 35 ns, and "T1" is 30 ns, "k" is 2. Therefore, the switching interval is set to 40 ns, which is equal to four times of the period of the original clock pulse. The switching interval is shorter than two times of the period of the M clock pulse (60 ns). This reduces the time required for reading a digital signal as well as increasing the reading rate.

FIG. 6 is a flowchart showing an image reading process performed by the CPU 11. First, a determination is made whether or not image data to be read has a length of 16 bit (S1).

If the data length is 16 bits (S1: Yes), the counter 41b is set to count from 54h up to 7Fh based on the system clock (S2). Next, the frequency divider 41c is set to generate M clock pulses in different ways according to the value of the counter 41b (S3). For example, in FIG. 4, each M clock pulse makes a low-to-high transition at 7Ah, 54h, 5Ah, 60h, 64h, 6Ah, 70h, and 76h. Each M clock pulse makes a high-to-low transition: 7Dh, 57h, 5Dh, 62h, 67h, 6Dh, 73h, and 78h.

Next, the register 41e and the register 41f are set to output different signals according to the counter value of the counter 41b (S4).

On the other hand, if the determination is made that the image data to be read has a length of 10 bits instead of 16 bits in S1 (S1: No), the counter 41b is set to count from 66h up to 7Fh based on the system clock (S5). Next, the frequency divider 41c is set to generate M clock pulses in different ways according to the value of the counter 41b (S6). Specifically, as each of the following counter values rises, each M clock pulse makes a low-to-high transition: 7Dh, 66h, 69h, 6Ch, 70h, 73h, 76h, and 79h. As each of the following counter values of the system clock falls, each M clock pulse makes a high-to-low transition: 7Eh, 67h, 6Ah, 6Dh, 71h, 74h, 71h, and 7Ah. Next, the register 41e and the register 41f are set to output different signals according to the counter value of the counter 41b (S7).

After either S4 or S7 is completed, the image corresponding to one page is read (S8). A determination is then made whether or not there is a next page (S9). If there is a next page (S9: Yes), the process returns to S8. If there is no next page (S9: No), this image reading process is finished.

As has been described above with reference to the embodiment, if "mT" that is the minimum switching interval determined by the length of digital data to be outputted and the switching rate of the AFEs 42 and 43, is shorter than "T1" that is the period of M clock pulses, switching interval for switching between the AFEs 42 and 43 is set to a value longer than "mT" and shorter than "T1". Furthermore, if "mT" is longer than "T1", the switching interval is set to a value longer than "mT" and shorter than (k×T1). "k" is a max integer equal to 0 or larger that satisfies (k×T1)>mT. These reduces the time required for reading an image as well as increases the reading rate, compared to the case in which the switching interval is set to be equal to an integer-times length of the signal input interval.

Although the present invention has been described with respect to the above embodiment, the present invention is not limited to the embodiment. It should be understood that various other changes, omissions, and additions may be made therein without departing from the spirit and scope of the present invention.

For example, although the embodiment relates the case in which an image reading process is performed in the OFF, the process may be performed in a single-function unit such as a printer or a facsimile machine.

Furthermore, the embodiment relates to the case in which the AFEs 42 and 43 includes the A/D converter so as to serial-output converted digital signals. However, the AFEs 42 and 43 may output analog signals without including the A/D converter. Alternatively, the AFEs 42 and 43 may parallel-output converted digital signals. Further, the AFEs 42 and 43 have only to able to switch simultaneously or alternately. Further, the AFEs are not limited to two, and may be three or more.

Furthermore, the embodiment relates to the case in which the CIS 47 is divided into two broader sections so that the respective broader sections are further divided into three subsections. However, the CIS 47 may simply be divided into two sections so that the respective output values are read. Further, the CIS 47 is not limited to six channels, and may be two or more.

What is claimed is:
1. An image reading device comprising:
  a clock generator configured to generate a first clock signal having a first cycle and a second clock signal having a second cycle shorter than the first cycle;
  an image sensor configured to detect an image formed on a document to generate an image signal;
  a plurality of switches including a first switch and a second switch, the image signal being inputted into the first switch and the second switch by rotation, the first switch and the second switch being capable of switching to simultaneously or alternately output the image signal in synchronization with the first clock;
  a reader configured to read the image signal outputted from the first switch and the second switch;
  a first controller configured to control the first switch to output the image signal to the reader during a first period and to control the second switch to output the image signal to the reader during a second period; and a second controller configured to control the clock generator to generate the first clock signal during the first period and the second period and to generate the second clock signal during a third period that is between the first period and the second period and that is longer than a predetermined period mT and shorter than (k×T1), the T1 being the first cycle, the k being a minimum integer that satisfies mT<(k×T1).

2. The image reading device according to claim 1, wherein the mT is a minimum period required for switching between the first switch and the second switch.

3. The image reading device according to claim 1, wherein if the mT is shorter than the T1, the k is 1.

4. The image reading device according to claim 3, wherein if the mT is longer than the T1, the k is larger than 1 and is a minimum integer that satisfies mT<(k×T1).

5. The image reading device according to claim 1, wherein the line image sensor includes a first section and a second section each including three or more sections, the image signal from the first section being inputted into the first switch, the image signal from the second section being inputted into the second switch.

6. The image reading device according to claim 1, wherein each of the first cycle and the second cycle is an integral multiple of a cycle of an original clock.

7. An image reading device comprising:
a clock generator configured to generate a first clock signal having a first cycle and a second clock signal having a second cycle shorter than the first cycle;
an image sensor configured to detect an image formed on a document to generate an image signal;
a plurality of switches including a first switch and a second switch, the image signal being inputted into the first switch and the second switch by rotation, the first switch and the second switch being capable of switching to simultaneously or alternately output the image signal in synchronization with the first clock;
a reader configured to read the image signal outputted from the first switch and the second switch;
a first controller configured to control the first switch to output the image signal to the reader during a first period and to control the second switch to output the image signal to the reader during a second period; and
a second controller configured to control the clock generator to generate the first clock signal during the first period and the second period and to generate the second clock signal during a third period that is between the first period and the second period and that is shorter than the first cycle.

\* \* \* \* \*